United States Patent [19]

Konda et al.

[11] Patent Number: 5,204,928
[45] Date of Patent: Apr. 20, 1993

[54] FLAME-RETARDANT COATED OPTICAL FIBER

[75] Inventors: Eizi Konda, Chiba; Nobuhisa Ishii, Ichihara; Toru Wakita, Chiba, all of Japan

[73] Assignee: The Furukawa Electric Co., Ltd., Tokyo, Japan

[21] Appl. No.: 888,915

[22] Filed: May 26, 1992

[30] Foreign Application Priority Data

May 28, 1991 [JP]  Japan .................................. 3-123851

[51] Int. Cl.⁵ ............................ G02B 6/44; G02B 6/10
[52] U.S. Cl. ..................................... 385/128; 385/100; 385/127; 385/141; 427/163
[58] Field of Search ............... 385/100, 102, 127, 128, 385/141, 147, 145; 427/163, 167

[56] References Cited

U.S. PATENT DOCUMENTS

| | | | |
|---|---|---|---|
| 4,344,669 | 8/1982 | Uchida et al. | 385/128 X |
| 4,514,037 | 4/1985 | Bishop et al. | 385/141 X |
| 4,682,850 | 7/1987 | White et al. | 385/128 X |
| 4,690,501 | 9/1987 | Zimmerman et al. | 385/141 X |
| 4,690,503 | 9/1987 | Janssen et al. | 385/141 X |
| 4,770,493 | 9/1988 | Ara et al. | 385/141 |
| 4,854,668 | 8/1989 | Mayr et al. | 385/128 X |
| 4,950,047 | 8/1990 | Berkey et al. | 385/100 X |
| 5,015,068 | 5/1991 | Petisce | 385/141 |
| 5,136,683 | 8/1992 | Aoki et al. | 385/141 |

FOREIGN PATENT DOCUMENTS

| | | | |
|---|---|---|---|
| EP-A-0083796 | 7/1983 | European Pat. Off. | 385/128 X |
| EP-A-0132228 | 1/1985 | European Pat. Off. | 385/128 X |
| EP-A-0146104 | 6/1985 | European Pat. Off. | 385/128 X |
| EP-A-0210770 | 2/1987 | European Pat. Off. | 385/128 X |
| EP-A-0295336 | 12/1988 | European Pat. Off. | 385/128 X |
| EP-A-0365129 | 4/1990 | European Pat. Off. | 385/128 X |

OTHER PUBLICATIONS

World Patents Index Latest, Week 8609, Derwent Publications, Ltd. London, G.B., an 86–058680 of JP-A-61 010 044, Jan. 1986.

World Patents Index Latest, Week 8628, Derwent Publications, Ltd. London, G.B.; an 86–178219 of JP-A-61 091 610, May 1986.

*Primary Examiner*—Brian Healy
*Attorney, Agent, or Firm*—Frishauf, Holtz, Goodman & Woodward

[57] ABSTRACT

In a flame-retardant coated optical fiber, which comprises an optical fiber, a primary coating layer covering the optical fiber, and a secondary coating layer covering the primary coating layer, the primary coating layer is made of an ultraviolet-curing resin, and the secondary coating layer is made of a resin composition containing 20 to 70 parts by weight of ethylene-bis-tetrabromophthalimide and 5 to 40 parts by weight of antimony trioxide, based on 100 parts by weight of thermoplastic polyester elastomer. The secondary coating layer of the coated optical fiber has high flame retardancy which is in conformity to the UL standard, and the bonding strength between the primary and secondary coating layers is high enough. Thus, a projection of the optical fiber during actual use is too small to damage a light source.

2 Claims, 1 Drawing Sheet

FLAME-RETARDANT COATED OPTICAL FIBER

BACKGROUND OF THE INVENTION

1. Field of the Invention

The present invention relates to a flame-retardant coated optical fiber, and specifically, to a flame-retardant coated optical fiber in which a projection of an optical fiber from its end face during actual use is very small.

2. Prior Art

Recently, there has been an increasing demand for securing flame-retardancy of various office automation apparatuses. Accompanying this trend, positive flame retardancy has been increasingly required of coated optical fibers which are used for the wire arrangement of these apparatuses.

As shown in the sectional view of FIG. 1, a typical coated optical fiber comprises an optical fiber 1, a primary coating layer 2 covering the fiber 1, and a secondary coating layer 3 covering the layer 2.

In order to obtain a flame-retardant version of this coated optical fiber, according to a generally known arrangement, a self-extinguishing thermosetting silicone rubber is used as a material of the primary coating layer 2, for example.

By means of the coated optical fiber which primary coating layer consists of the thermosetting silicone rubber, however, it is hard to enhance its flame retardancy to a level standing the VW-1 test prescribed by UL1581.

Accordingly, a proposed flame-retardant coated optical fiber is such that the thermosetting silicone rubber is used for a primary coating layer. And this coating layer is covered with a secondary coating layer which consists of a plastic material blended with a brominated flame retardant such as decabromodiphenyl oxide or tetrabromophthalic anhydride. This coated optical fiber exhibits an appreciable flame retardancy, due to a synergistic effect produced by the self-extinguishing property of the thermosetting silicone rubber for the primary coating layer and the good flame retardancy of the brominated flame retardant in the secondary coating layer.

In the coated optical fiber covered by the primary coating layer consisting of the thermosetting silicone rubber, however, the adhesion of the secondary coating layer to the primary coating layer is insufficient. In some cases, therefore, the optical fiber, as a core of the coated optical fiber, may project from the end face of the coatd fiber if it is repeatedly subjected to temperature change, thereby damaging a light source which is connected directly to the optical fiber.

SUMMARY OF THE INVENTION

An object of the present invention is to provide a flame-retardant coated optical fiber enjoying high flame retardancy.

Another object of the present invention is to provide a flame-retardant coated optical fiber in which a projection of an optical fiber from its end face during actual use is small enough to prevent damage to a light source connected directly to the fiber.

In order to achieve the above objects, according to the present invention, there is provided a flame-retardant coated optical fiber comprising: an optical fiber; a primary coating layer covering the optical fiber, the primary coating layer comprising an ultraviolet-curing resin; and a secondary coating layer covering the primary coating layer, the secondary coating layer comprising a material containing 20 to 70 parts by weight of ethylene-bis-tetrabromophthalimide and 5 to 40 parts by weight of antimony trioxide, based on 100 parts by weight of thermoplastic polyester elastomer.

DETAILED DESCRIPTION

Figure 1:
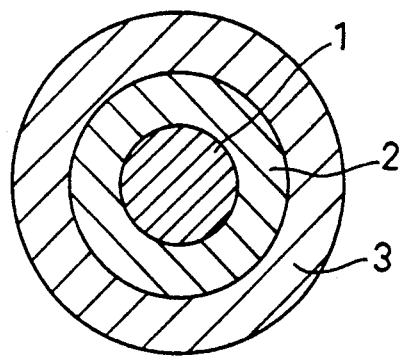
FIG. 1 is a sectional view of an optical fiber cable.

A primary coating layer of a flame-retardant coated optical fiber according to the present invention comprises an ultraviolet-curing resin.

Although ultraviolet-curing resins to be used are not particularly limited, available ultraviolet-curing resins include, for example, polyether-, polyester-, epoxy-, and polybutadiene-based urethane acrylates, or silicone acrylates.

These ultraviolet-curing resins are highly adherent to a secondary coating layer (mentioned later), so that the bonding strength between the primary and secondary coating layers is enhanced.

Thus, the ultraviolet-curing resins serve to reduce a length of projection of the optical fiber which projects from the end face of the coated fiber during actual use of the coated fiber.

The secondary coating layer is a resin composition which comprises thermoplastic polyester elastomer as a base material, blended with ethylene-bis-tetrabromophthalimide, as a brominated flame retardant, and antimony trioxide, as a flame-retardant assistant.

The secondary coating layer containing ethylene-bis-tetrabromophthalimide as the flame retardant has an exellent adhesion to the primary coating layer, as compared with those using other brominated flame retardants, and can minimize the projection of the optical fiber mentioned above.

The loading of ethylene-bis-tetrabromophthalimide is adjusted to 20 to 70 parts by weight based on 100 parts by weight of thermoplastic polyester elastomer. If the loading is lower than 20 parts by weight, the flame retardancy of the resulting resin composition is insufficient. If the loading is higher than 70 parts by weight, on the other hand, the adhesion to the primary coating layer is insufficient, so that an amount of the projection of the optical fiber during actual use becomes intolerable. Preferably, the loading ought to range from 30 to 60 parts by weight based on 100 parts by weight of thermoplastic polyester elastomer, and on an optimal base, from 30 to 40 parts by weight.

Antimony trioxide is a flame-retardant assistant which serves, in combination with ethylene-bis-tetrabromophthalimide, to improve the flame retardancy, and its loading is adjusted to 5 to 40 parts by weight based on 100 parts by weight of thermoplastic polyester elastomer. If the loading is lower than 5 parts by weight, this material cannot provide any flame-retardant effect. If the loading exceeds 40 parts by weight, on the other hand, the projection of the optical fiber during the actual use of the coated fiber lengthens. Preferably, the loading ranges from 7 to 30 parts by weight based on 100 parts by weight of thermoplastic polyester elastomer, and on an optimal base, from 10 to 25 parts by weight.

The flame retardant-coated optical fiber according to the present invention is produced by coating an optical fiber with the aforementioned primary coating layer, then irradiating the resulting structure with ultraviolet rays to treat the primary coating layer, and further extrusion-coating the primary coating layer with the aforementioned secondary coating layer. The dose of ultraviolet rays applied to the primary coating layer preferably ranges from about 100 to 1000 mJ/cm², and the extrusion temperature preferably ranges from about 210° to 240° C.

EXAMPLES 1 TO 4 AND CONTROLS 1 TO 7

Optical fibers each having a diameter of 0.125 mm were coated respectively with primary coating layers (0.14 mm thick) shown in Table 1. For Examples 1 to 4 and Controls 1 to 5, the primary coating layer was formed by first applying an ultraviolet-curing resin (including photopolymerization initiator) to each optical fiber and then irradiating the resulting structure with 300 mJ/cm² of ultraviolet rays. For Controls 6 to 8, the primary coating layer was formed by applying a silicone resin to each optical fiber and curing the resin by heating.

The flame retardancy and optical fiber projections of the individual coated optical fibers thus obtained were examined according to the following specifications. The measurement results are shown in Table 1 below.

Flame retardancy

The VW-1 test was conducted according to the method prescribed by UL1581. Circles and crosses represent "acceptable" and "unacceptable", respectively.

Projection

Each coated optical fiber was cut to a length of 1.5 m, the cut piece was subjected to 100 cycles of a heat cycle test in a range from −40° to 80° C., and the projection was measured in profile by using a universal projector. Circles represent those specimens with optical fiber projections less than 0.5 mm, while crosses represent those specimens with fiber projections longer than 0.5 mm.

TABLE 1

|  |  | Example No. | | | | Control No. | | | | | | | |
| --- | --- | --- | --- | --- | --- | --- | --- | --- | --- | --- | --- | --- | --- |
|  |  | 1 | 2 | 3 | 4 | 1 | 2 | 3 | 4 | 5 | 6 | 7 | 8 |
| Material of primary coating layer | | Ultraviolet-curing resin *3 | | | | Ultraviolet-curing resin *3 | | | | | Silicone resin | | |
| Composition of secondary coating layer (parts by weight) | HYTREL HTC2551 *1 | 100 | 100 | 100 | 100 | 100 | 100 | 100 | 100 | 100 | 100 | 100 | 100 |
| | SAYTEX BT93 *2 | 30 | 60 | 30 | 60 | 15 | 90 | 90 | 60 | — | 15 | 60 | 0 |
| | Tetrabromophtalic anhydride | — | — | — | — | — | — | — | — | 30 | — | — | — |
| | Sb$_2$O$_3$ | 7 | 7 | 30 | 30 | 7 | 30 | 3 | 50 | 7 | 7 | 30 | 0 |
| Flame retardancy | | ○ | ○ | ○ | ○ | X | ○ | X | ○ | ○ | ○ | ○ | X |
| Projection | | ○ | ○ | ○ | ○ | ○ | X | X | X | X | X | X | X |

*1: Trademark; thermoplastic polyester elastomer from Toray-Dupont Industries, Inc.
*2: Trademark; ethylene-bis-tetrabromophthalimide from SAYTEX Co., Ltd.
*3: Polyester-based urethane acrylate ultraviolet-curing resin
*4: Thermosetting resin

What is claimed is:

1. A flame-retardant coated optical fiber comprising:
    an optical fiber;
    a primary coating layer covering the optical fiber, said primary coating layer comprising an ultraviolet-curing resin; and
    a secondary coating layer covering the primary coating layer, said secondary coating layer comprising a material containing 20 to 70 parts by weight of ethylene-bis-tetrabromophthalimide and 5 to 40 parts by weight of antimony trioxide, based on 100 parts by weight of thermoplastic polyester elastomer.

2. A flame-retardant coated optical fiber according to claim 1, wherein said ultraviolet-curing resin is a urethane acrylate compound or a silicone acrylate compound.

* * * * *